United States Patent
Cramer

(10) Patent No.: US 7,845,193 B2
(45) Date of Patent: Dec. 7, 2010

(54) APPARATUS FOR OPENING AND CLOSING MOLDS IN A GLASSWARE FORMING MACHINE

(75) Inventor: Jeffrey W. Cramer, Liberty Center, OH (US)

(73) Assignee: Owens-Backway Glass Container Inc, Perrysburg, OH (US)

( * ) Notice: Subject to any disclaimer, the term of this patent is extended or adjusted under 35 U.S.C. 154(b) by 718 days.

(21) Appl. No.: 11/803,973

(22) Filed: May 16, 2007

(65) Prior Publication Data

US 2008/0282739 A1    Nov. 20, 2008

(51) Int. Cl.
*C03B 9/40* (2006.01)

(52) U.S. Cl. ............................. 65/359; 65/357; 65/360; 65/361

(58) Field of Classification Search .................. 65/359, 65/360, 357, 361
See application file for complete search history.

(56) References Cited

U.S. PATENT DOCUMENTS

| 1,875,796 | A |   | 9/1932 | Allen |
|---|---|---|---|---|
| 1,888,318 | A |   | 11/1932 | Hofman |
| 1,911,870 | A |   | 5/1933 | Algeo et al. |
| 1,975,050 | A |   | 9/1934 | Peiler |
| 2,702,444 | A |   | 2/1955 | Rowe |
| 3,206,296 | A |   | 9/1965 | Mennitt |
| 3,528,796 | A |   | 9/1970 | Trahan |
| 3,591,358 | A | * | 7/1971 | Maul et al. ............. 65/360 |
| 3,798,019 | A |   | 3/1974 | Bystrianyk et al. |
| 4,375,979 | A |   | 3/1983 | Newkirk et al. |
| 4,826,524 | A |   | 5/1989 | Foster |
| 4,832,727 | A | * | 5/1989 | Libert ................... 65/357 |
| 5,019,147 | A |   | 5/1991 | Voisine et al. |
| 5,306,325 | A | * | 4/1994 | Smith et al. ............. 65/357 |
| 5,824,131 | A |   | 10/1998 | Grant et al. |
| 6,098,427 | A | * | 8/2000 | Kirkman ............... 65/261 |
| 6,557,380 | B1 | * | 5/2003 | DiFrank et al. ........... 65/359 |
| 6,684,665 | B1 |   | 2/2004 | Bogert et al. |
| 2006/0162383 | A1 | * | 7/2006 | Tijerina-Ramos et al. ....... 65/68 |

OTHER PUBLICATIONS opposite definition [online], [retrieved on May 20, 2010], retrieved from Dictionary.com (http://dictionary.reference.com/browse/opposite).*

* cited by examiner

*Primary Examiner*—Matthew J. Daniels
*Assistant Examiner*—Yana Belyaev

(57) ABSTRACT

Apparatus for opening and closing mold arms in a glassware forming machine includes a gearbox for mounting on a glassware machine frame, a cylinder housing suspended beneath the gearbox, and a cylinder disposed within the cylinder housing. The cylinder has a piston with an extending piston rod and a gear rack machined or otherwise formed in the piston rod. A first drive gear in the cylinder housing is coupled to the gear rack and a drive shaft extends from the first drive gear and the cylinder housing into the gearbox. A second drive gear is disposed in the gearbox and coupled to the drive shaft. Laterally spaced operating shafts extend upwardly from within the gearbox. Means including an idler gear couple the second drive gear to the operating shafts such that the operating shafts are rotated simultaneously in opposite directions by the cylinder, the gear rack, the first and second drive gears and the idler gear. In exemplary embodiments of the disclosure, the means include driven gears or connecting links coupling the second drive gear and the idler gear to the operating shafts. Linkages couple the operating shafts to the mold arms of the glassware forming machine.

15 Claims, 18 Drawing Sheets
APPARATUS FOR OPENING AND CLOSING MOLDS IN A GLASSWARE FORMING MACHINE The present disclosure relates to an apparatus for opening and closing the blank molds and/or the blow molds of a glassware forming machine.

BACKGROUND AND SUMMARY OF THE DISCLOSURE

Glassware forming machines, including particularly individual section glassware forming machines, include one or more blank molds for forming molten glass gobs into glass parisons, blow molds for blowing the glass parisons into articles of glassware such as glass containers, and transfer mechanisms for transferring the glass parisons from the blank molds to the blow molds and for transferring the articles of glassware from the blow molds. The blank molds and the blow molds typically are formed by mold halves mounted on mold arms for opening and closing the molds. A general object of the present disclosure is to provide an apparatus for opening and closing the blank molds and/or the blow molds of a glassware forming machine, which is easily serviced and thereby reduces machine downtime for maintenance and repair.

The present disclosure embodies a number of aspects that can be implemented separately from or in combination with each other.

Apparatus for opening and closing mold arms in a glassware forming machine, in accordance with one aspect of the present disclosure, includes a gearbox for mounting on a glassware machine frame, a cylinder housing suspended beneath the gearbox, and a cylinder disposed within the cylinder housing. The cylinder has a piston with an extending piston rod and a gear rack machined or otherwise formed in the piston rod. A first drive gear in the cylinder housing is coupled to the gear rack and a drive shaft extends from the first drive gear and the cylinder housing into the gearbox. A second drive gear is disposed in the gearbox and coupled to the drive shaft. Laterally spaced operating shafts extend upwardly from within the gearbox. Means including an idler gear couple the second drive gear to the operating shafts such that the operating shafts are rotated simultaneously in opposite directions by the cylinder, the gear rack, the first and second drive gears and the idler gear. In exemplary embodiments of the disclosure, the means include driven gears or connecting links coupling the second drive gear and the idler gear to the operating shafts. Linkages couple the operating shafts to the mold arms of the glassware forming machine.

BRIEF DESCRIPTION OF THE DRAWINGS

The disclosure, together with additional objects, features, advantages and aspects thereof, will best be understood from the following description, the appended claims and the accompanying drawings, in which:

DETAILED DESCRIPTION OF PREFERRED EMBODIMENTS

Figure 1:
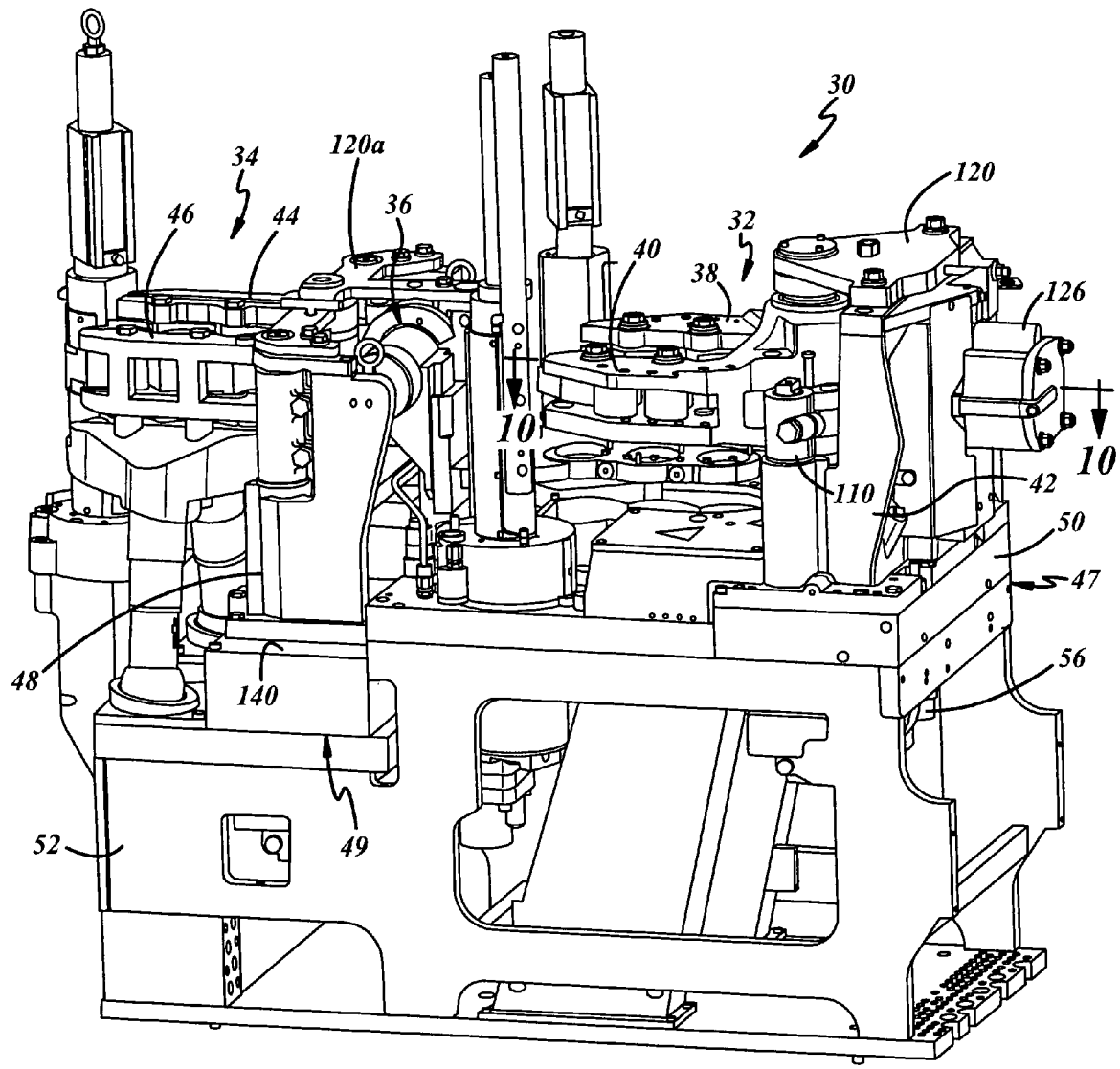
FIG. 1 is a side perspective view of a section of a glassware forming machine in accordance with an exemplary embodiment of the present disclosure.
Figure 2:
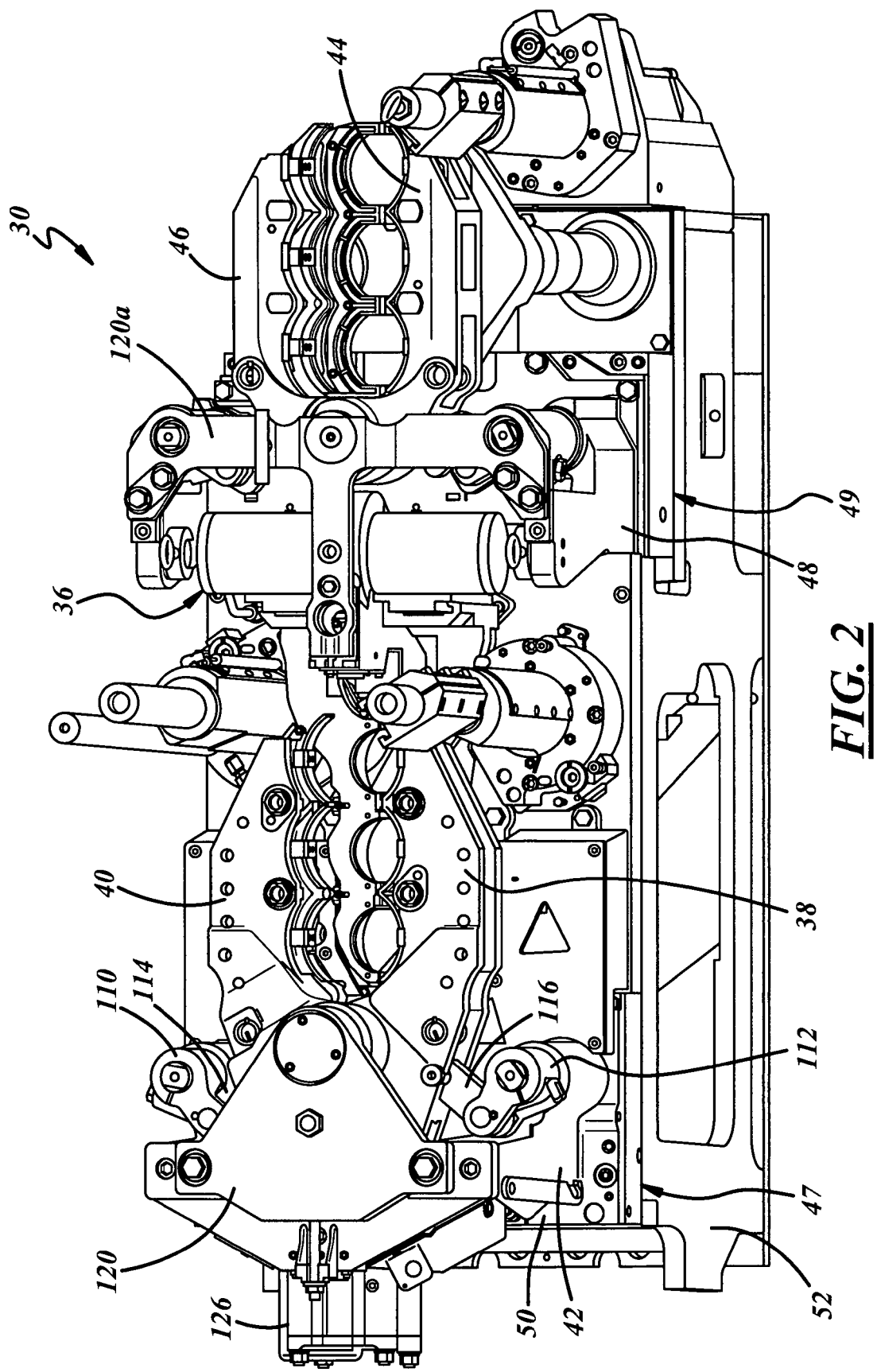
FIG. 2 is a top perspective view of the machine section in FIG. 1.

FIGS. 1 and 2 illustrate an exemplary section 30 of a glassware forming machine in which a mechanism for opening the blank molds and/or the blow molds can be implemented in accordance with the present disclosure. Machine section 30 generally includes a blank mold station 32, a blow mold station 34 and an invert arm assembly 36 for transferring glass parisons from the blank mold station to the blow mold station. Various devices that overlie the blank mold station and the blow mold station have been left out of FIGS. 1 and 2 for clarity. The blank mold station 32 preferably includes a pair of blank mold arms 38,40 mounted on a blank mold support bracket 42. Likewise, blow mold station 34 preferably includes a pair of mold arms 44,46 mounted on a blow mold support bracket 48. Blank mold station 32 and blow mold station 34, together with other transfer and operating mechanisms of machine sections 30, preferably are mounted on a section frame 52. Section frame can be enclosed to form a closed section box. Mechanisms 47, 49 for opening and closing the blank at blow molds are mounted under, preferably directly under, the blank mold and the blow mold support brackets 42, 48 respectively.

Figure 5:
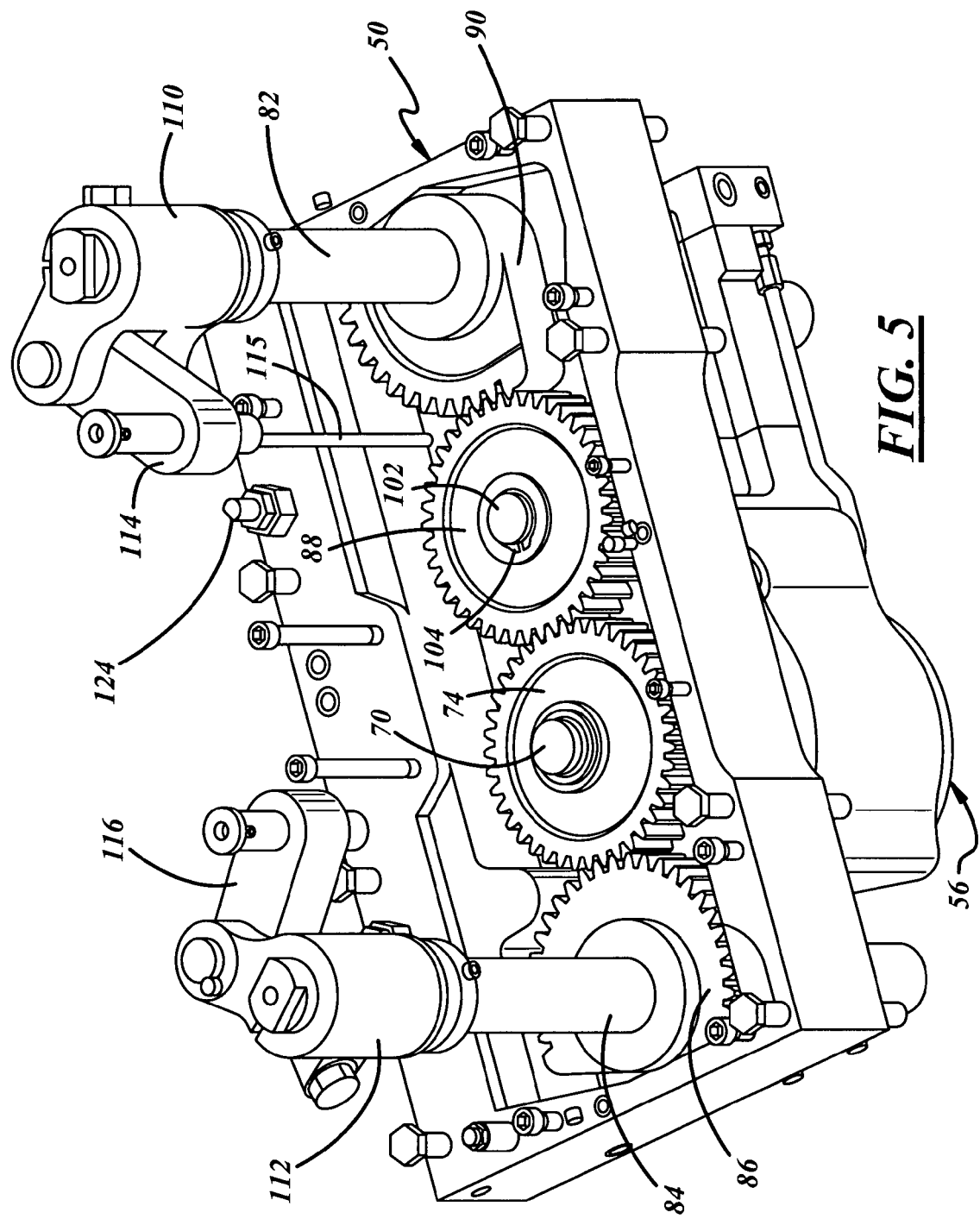
FIG. 5 is a perspective view of the mechanism of FIGS. 3 and 4 with the blank support bracket removed.
Figure 6:
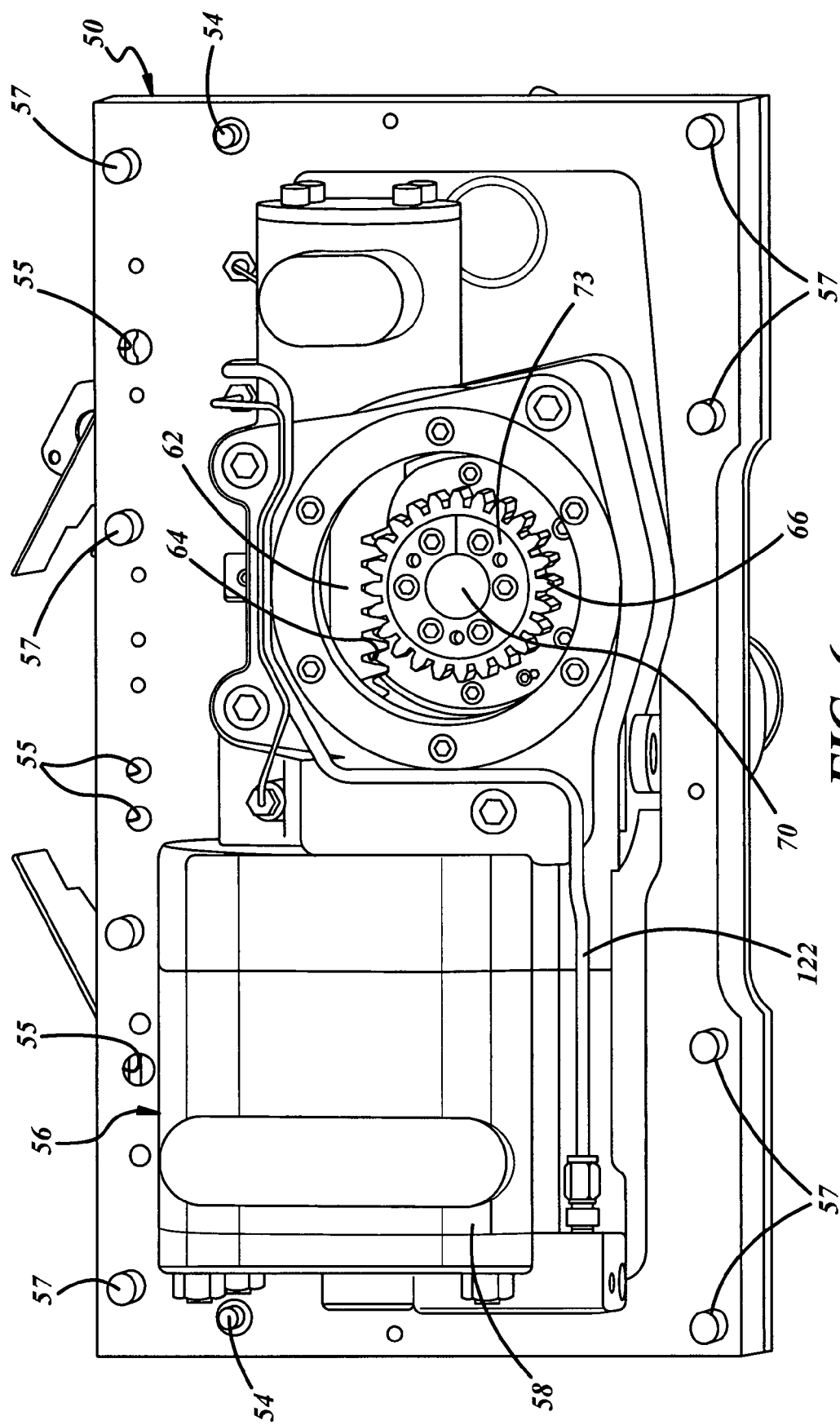
FIG. 6 is a perspective view of the underside of the mechanism in FIG. 5 with the cylinder housing cover removed.

Referring now to FIGS. 3-9, blank mold support bracket 42 is mounted on a gearbox 50, which in turn is mounted on the section frame 52. Gearbox 50 has parallel locating pins 54 for aligning gearbox 50 to section frame 52. Gearbox 50 is attached to section frame 52 by an array of fasteners 57. Gearbox 50 also has a plurality of ports 55 that align with corresponding ports on machine section frame 52 to feed operating air and fluid to mechanism 47. A cylinder housing 56 is suspended beneath gearbox 50. Within cylinder housing 56 there is an operating actuator 58. Actuator 58 can be an electrical actuator but preferably is a fluid actuator, most preferably an air cylinder. Cylinder 58 has an internal piston 60 with an axially extending piston rod 62. Gear teeth 64 (FIG. 6) are machined or otherwise formed in piston rod 62. A first drive gear 66 is disposed beneath a cylinder housing cover 68 (removed in FIG. 6) and has a peripheral array of gear teeth engaged with gear teeth 64 on piston rod 62. Gear teeth 64 thus forms a rack that drives gear 66. A drive shaft 70 extends from first drive gear 66 through the lower wall 72 of gearbox 50. First drive gear 66 preferably is coupled to drive shaft 70 by a locking hub 73. Within gearbox 50, a second drive gear 74 is mounted to drive shaft 70 and held thereon by a lock nut 75 or the like. A cavity composed of a pocket 76 (FIG. 8) is formed in a wall of cylinder housing 56 coaxially aligned with piston rod 62 and receives the end 78 of piston rod 62 in the fully open position of the blank mold arms. An annular seal 80 is disposed within pocket 76 and engages rod end 78 to form an air cushion, as will be described. Piston rod 62 preferably is supported by a gland seal 79 adjacent to cylinder 58 and by a sleeve bearing 81 on the opposing side of rack gear teeth 64 (FIG. 6).

Figure 5A:
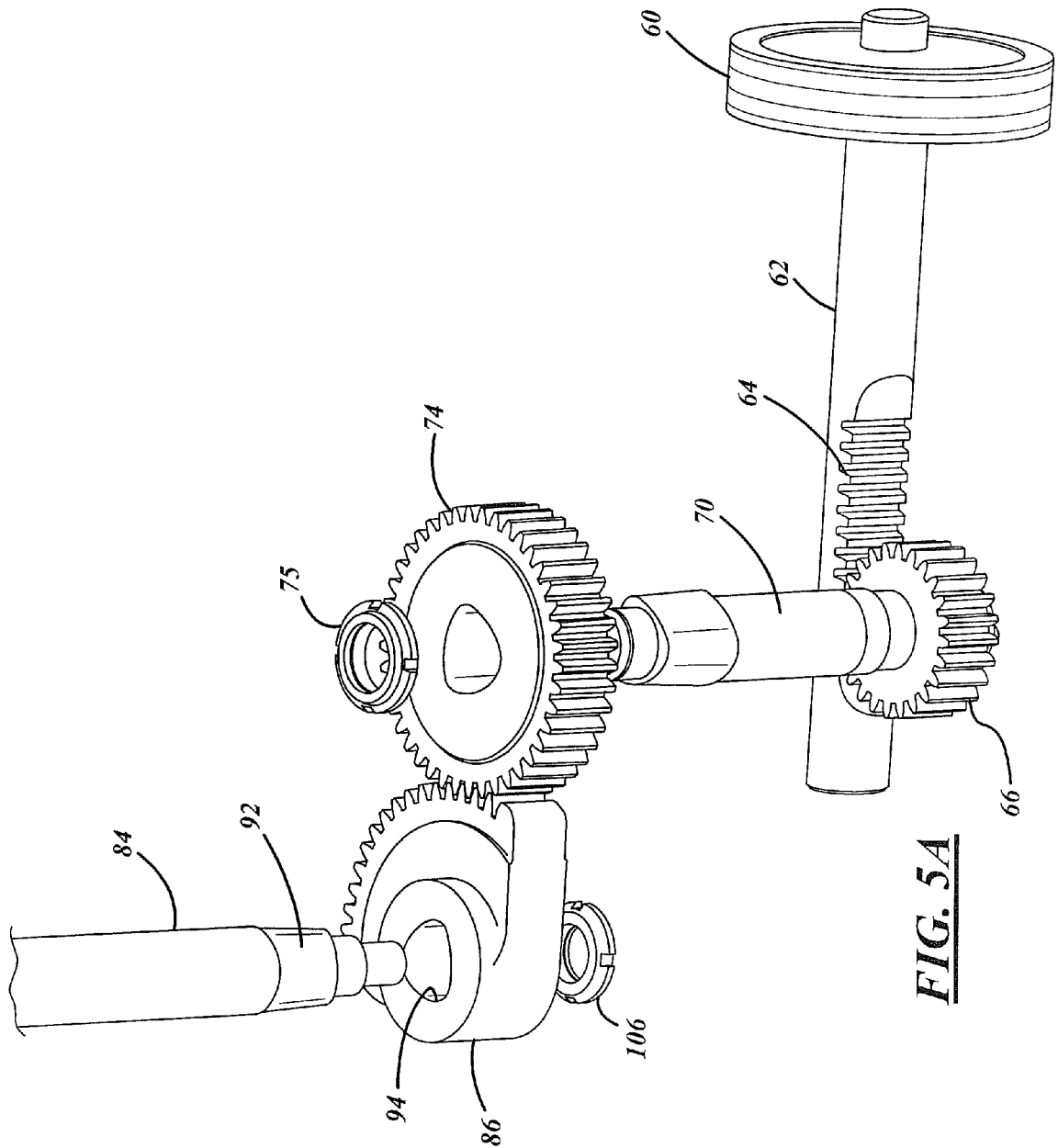
Figure 7:
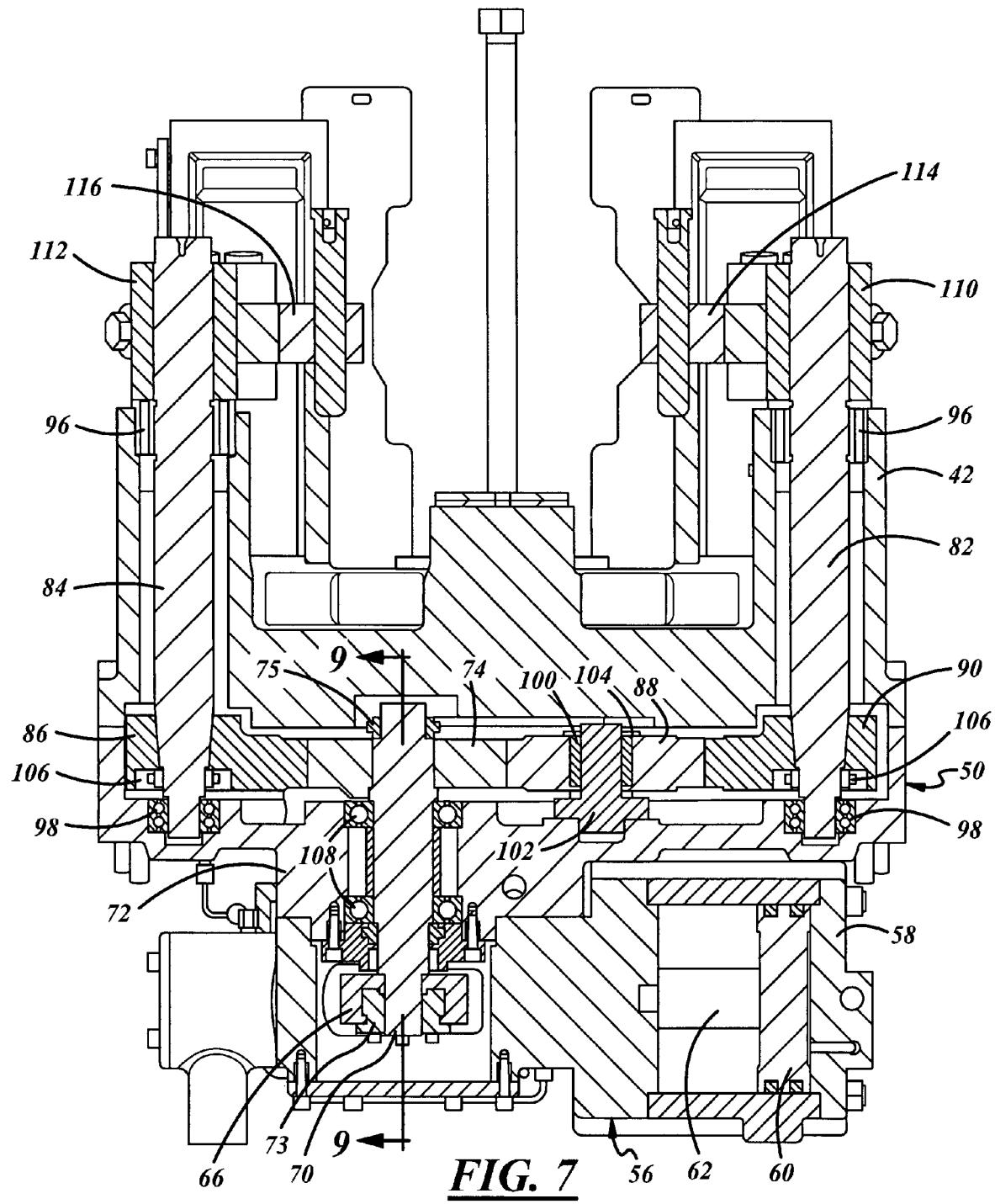
FIGS. 7 and 8 are sectional views taken substantially along the respective lines 7-7 and 8-8 in FIG. 3.
Figure 8:
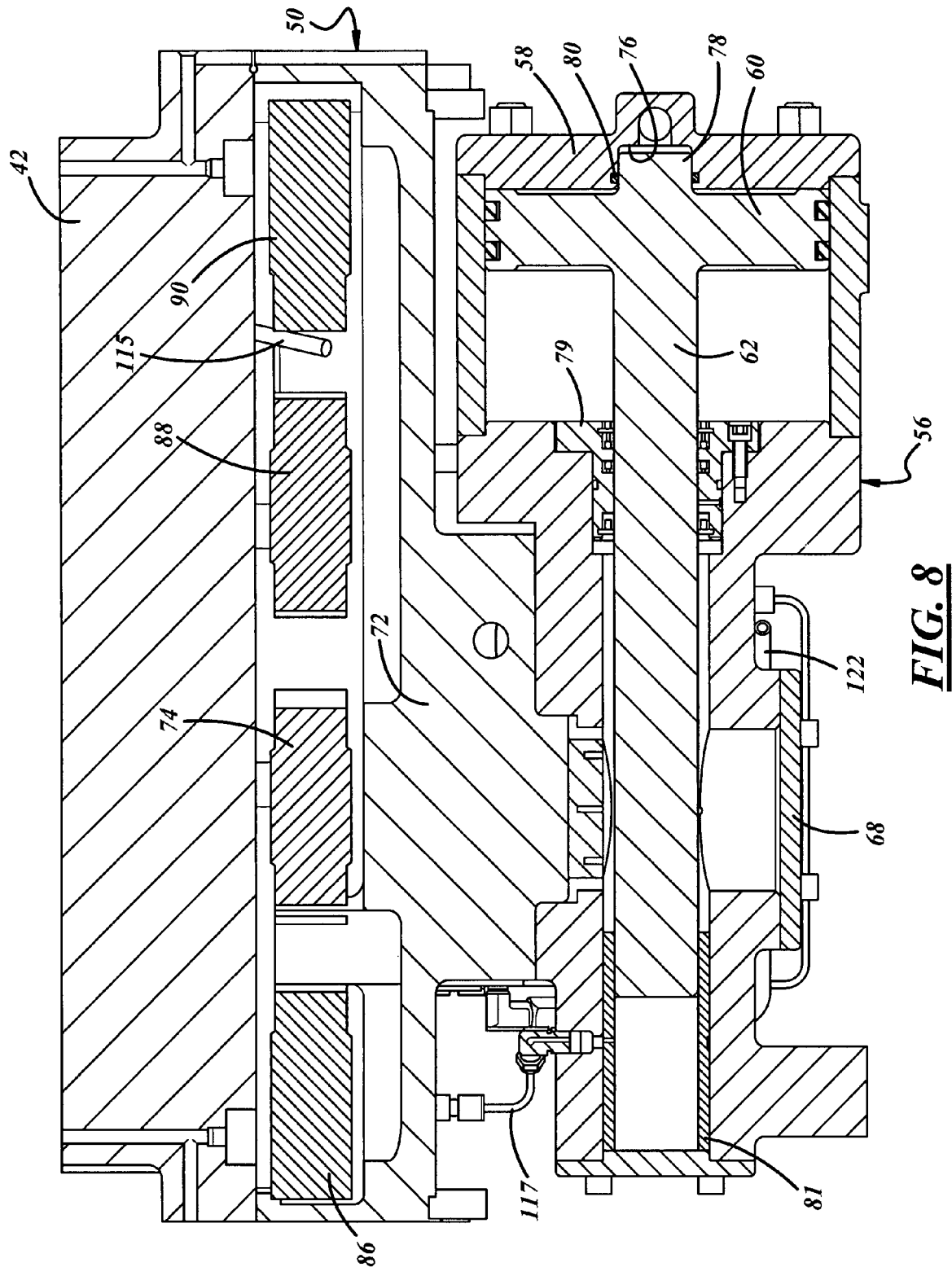
Figure 9:
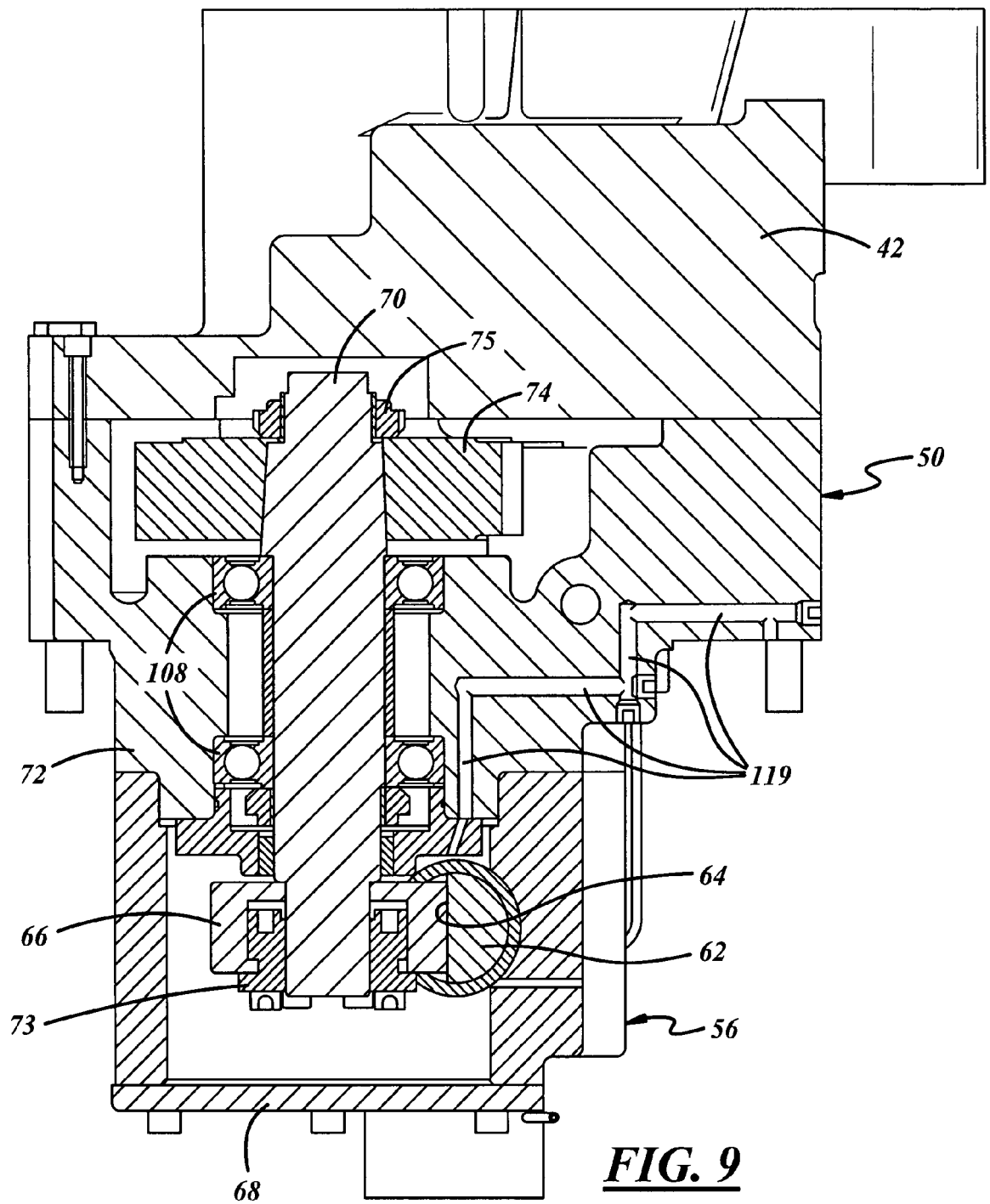
FIG. 9 is a sectional view taken substantially along the line 9-9 in FIG. 7.

A pair of operating shafts 82,84 (FIGS. 5 and 7) extend upwardly from the laterally opposed sides of gearbox 50. Operating shafts 82, 84 preferably are enclosed by corresponding portions of blank mold support bracket 42, as best seen in FIG. 7. Second drive gear 74 preferably is directly coupled to a gear 86, which in turn is coupled to the lower end of operating shaft 84. Second drive gear 74 also is coupled through an idler gear 88 to a gear 90 that is coupled to the lower end of operating shaft 82. Gears 86, 90 preferably are sector gears, as best seen in FIG. 5. Gears 86,90 preferably have alignment marks to ensure proper positioning during assembly. Shafts 70,82,84 preferably are coupled to gears 66,74,86,90 in such a way as to prevent backlash between the shafts and the gears. FIG. 5A shows that operating shaft 84 preferably has a tapered polygonal end 92 that is received within a correspondingly tapered polygonal center opening 94 in gear 86. Identical tapered polygonal couplings preferably are employed between operating shaft 82 and gear 90, and between drive shaft 70 and first and second drive gears 66,74, as best seen in FIG. 5A. Operating shaft 82 is supported by an upper bearing 96 carried by support bracket 42 and a roller bearing 98 disposed within gearbox 50. Operating shaft 84 also has support bearings 96,98. Idler gear 88 is rotatably supported by a bearing 100 received on a stub shaft 102 within gearbox 50 and may be secured to shaft 102 by a snap ring 104. Gears 90,86 preferably are secured to operating shafts 82,84 by lock nuts 106. Drive shaft 70 preferably is supported within gearbox wall 72 by spaced bearings 108. Levers 110,112 are coupled to the upper ends of operating shafts 82,84 for pivotal connection to blank mold arms 38,40 by means of links 114, 116. The interior of gear box 50 preferably is filled with lubricant, such as oil, to reduce gear wear. The oil level can be checked by a means of a dipstick 115 (FIGS. 5 and 8). A line 117 (FIG. 8) feeds lubricant to sleeve bearing 81 in cylinder housing 56. A passage 119 in wall 72 of gearbox 50 (FIG. 9) provides an inlet for feeding lubricant to the chamber within gearbox 50 surrounding rack gear teeth 64 (FIG. 6) and first drive gear 66.

Figure 3:
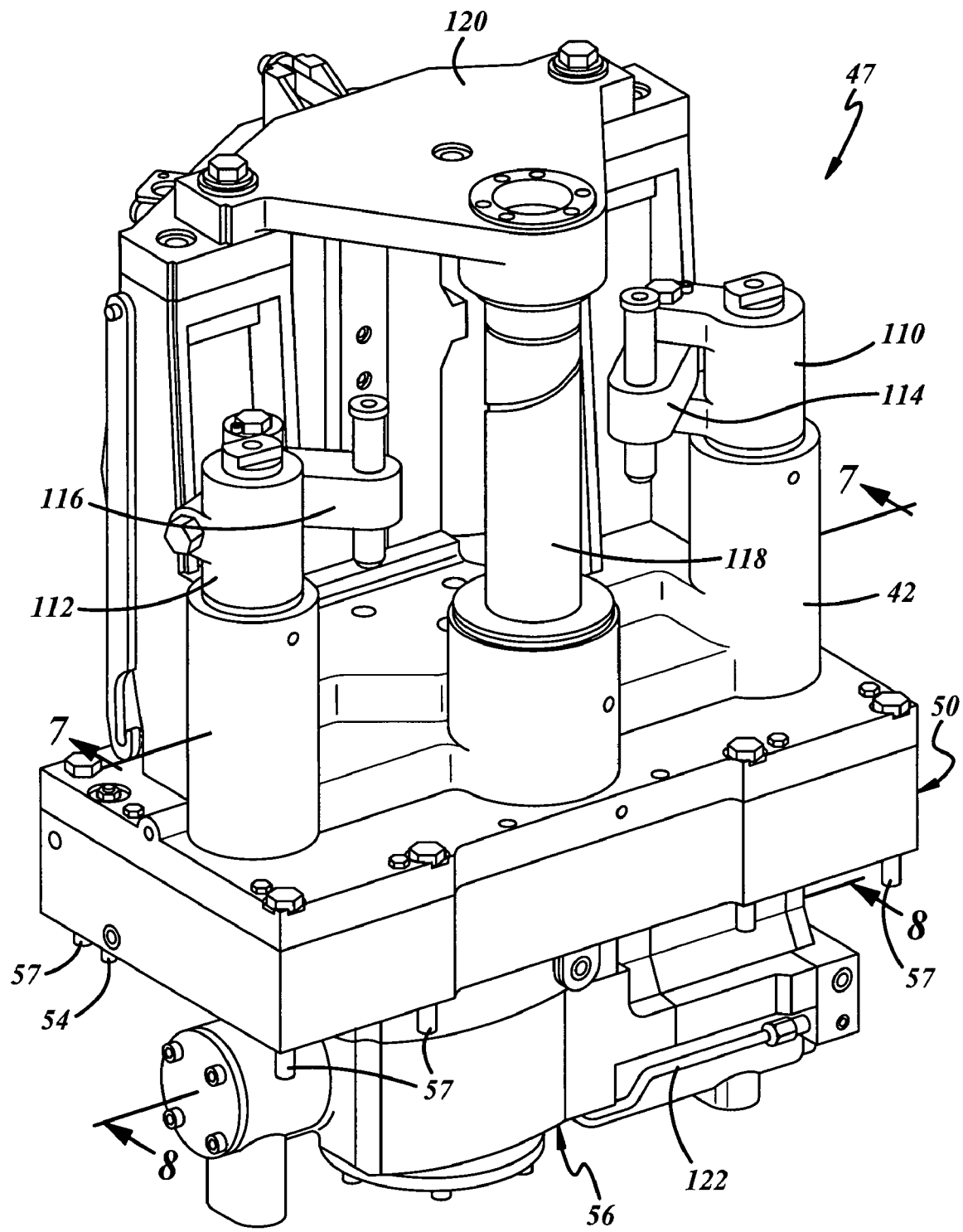
FIG. 3 is a front perspective view of the blank mold operating mechanism in the machine section of FIGS. 1 and 2 with the mold arms removed for clarity.
Figure 4:
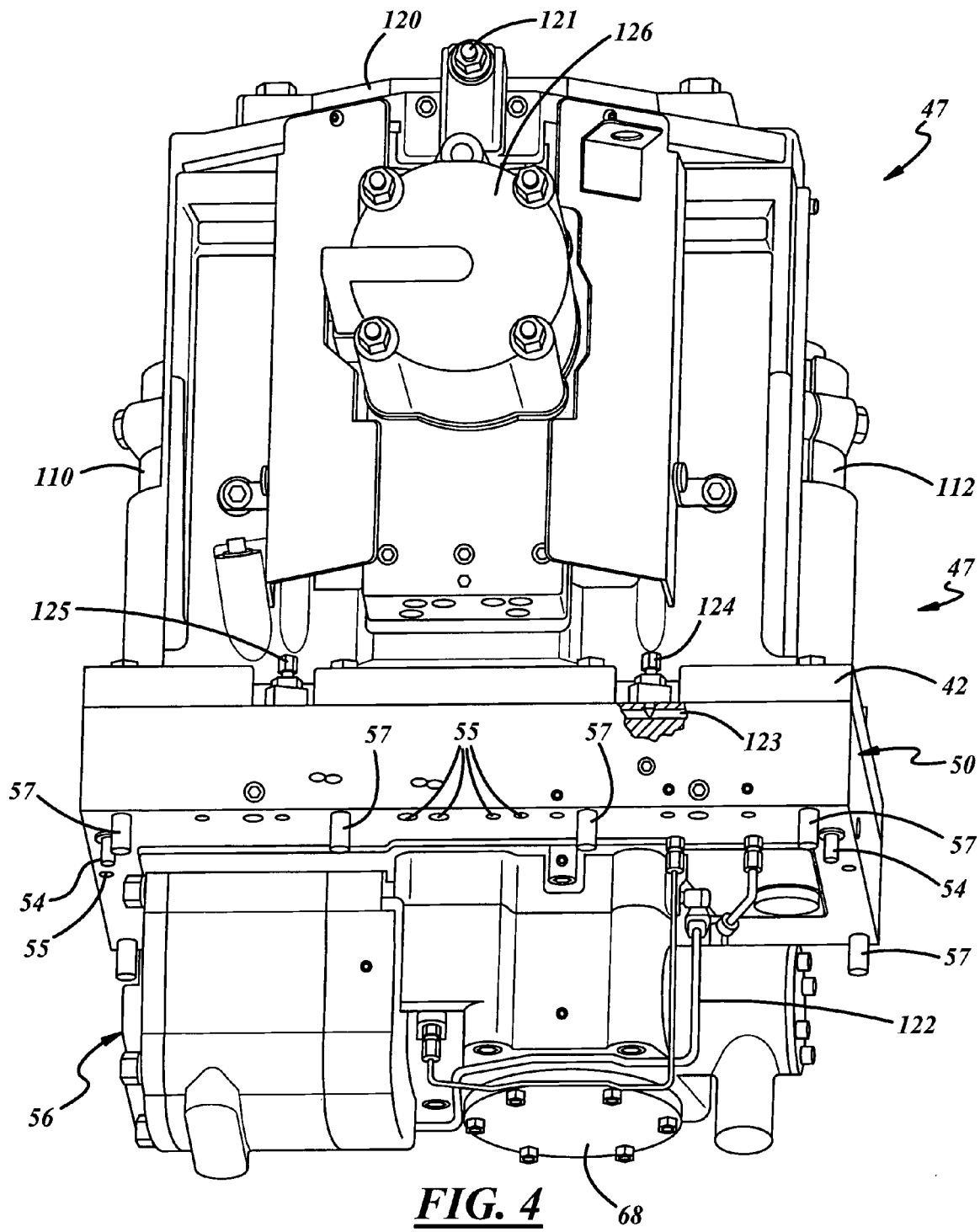
FIG. 4 is a rear perspective view of the blank mold operating mechanism of FIG. 3.
Figure 10:
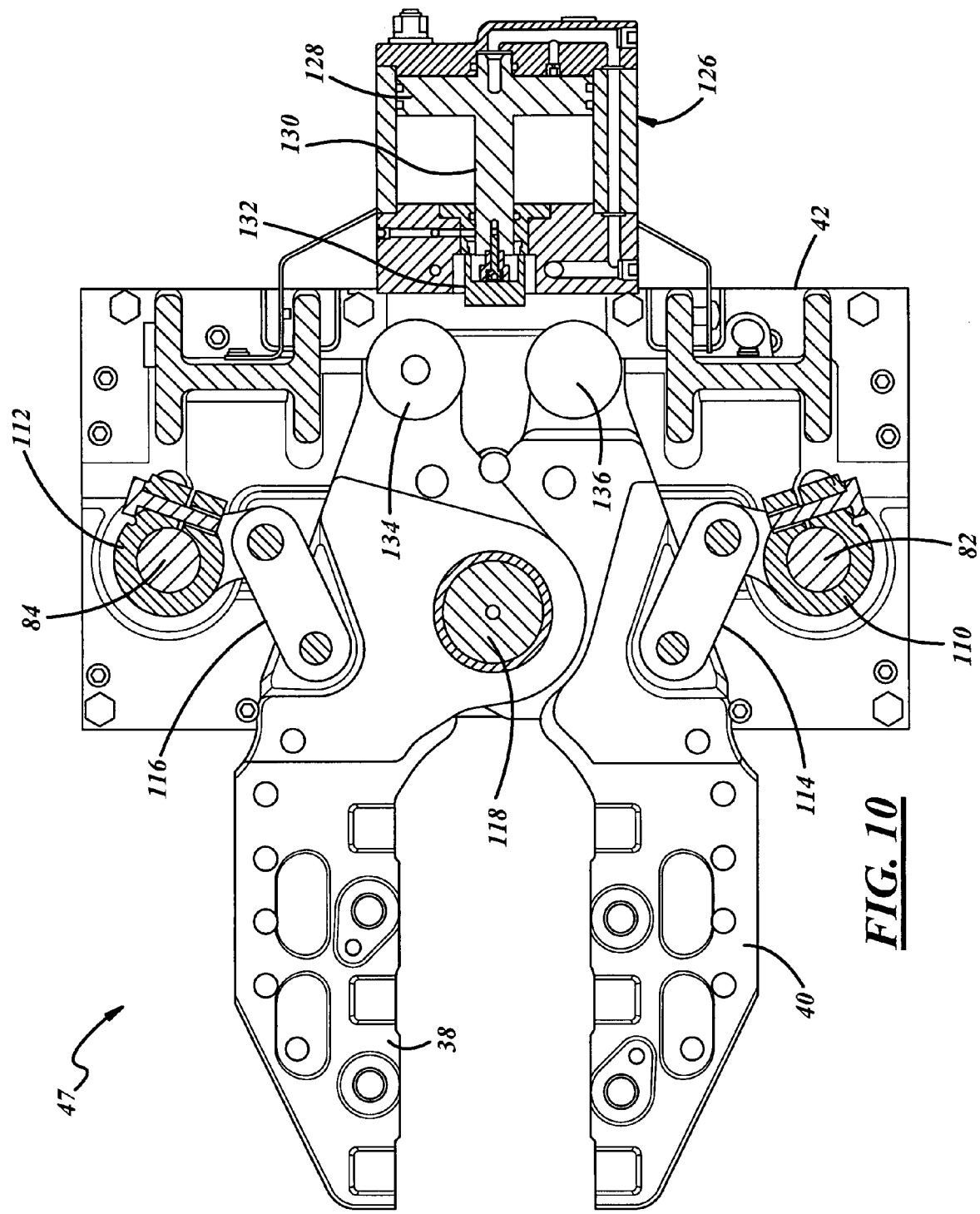
FIG. 10 is a partially sectioned view taken substantially along the line 10-10 in FIG. 1.
Figure 11:
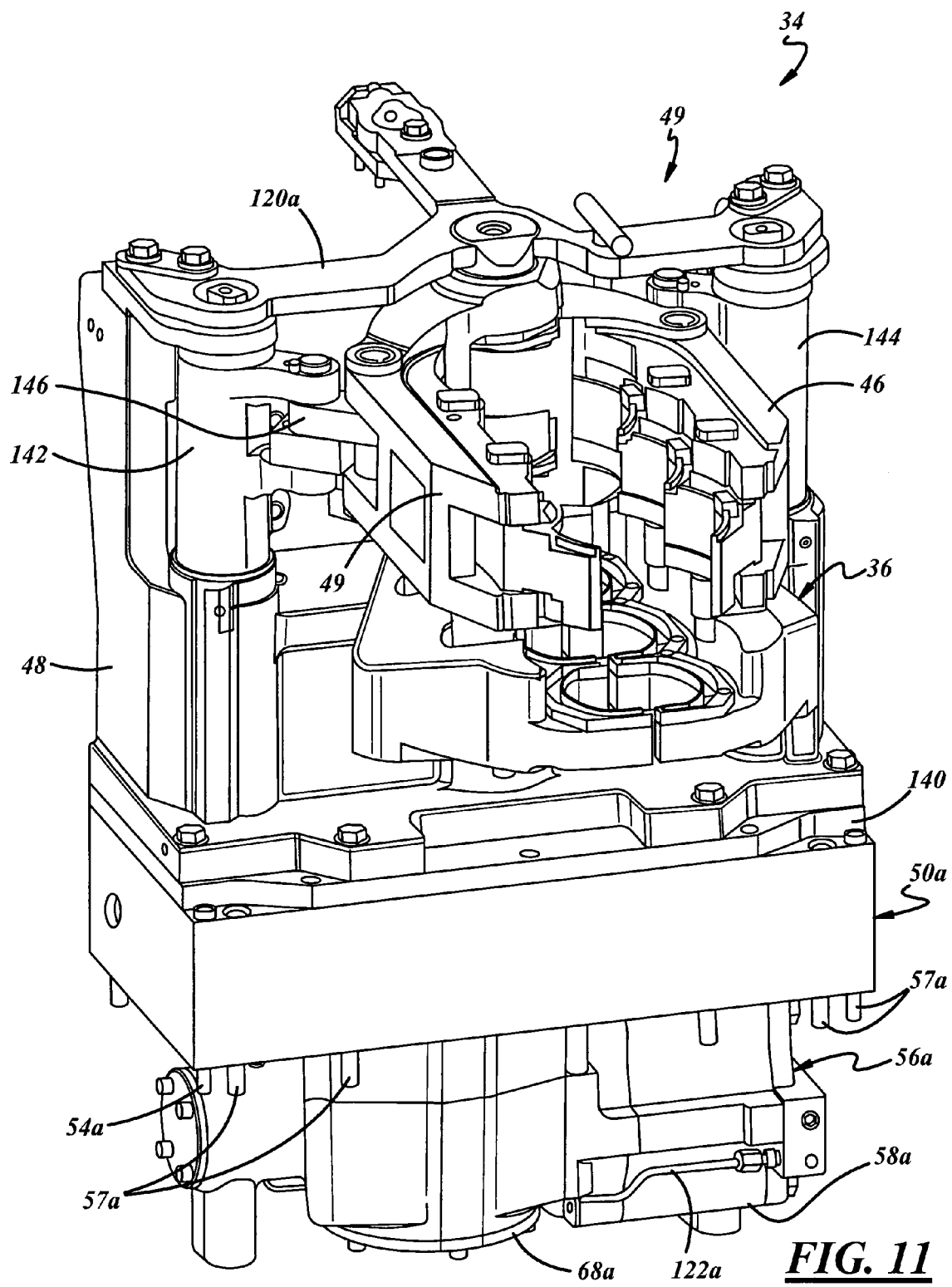
FIG. 11 is a front perspective view of the blow mold operating mechanism in the machine section of FIGS. 1 and 2.
Figure 12:
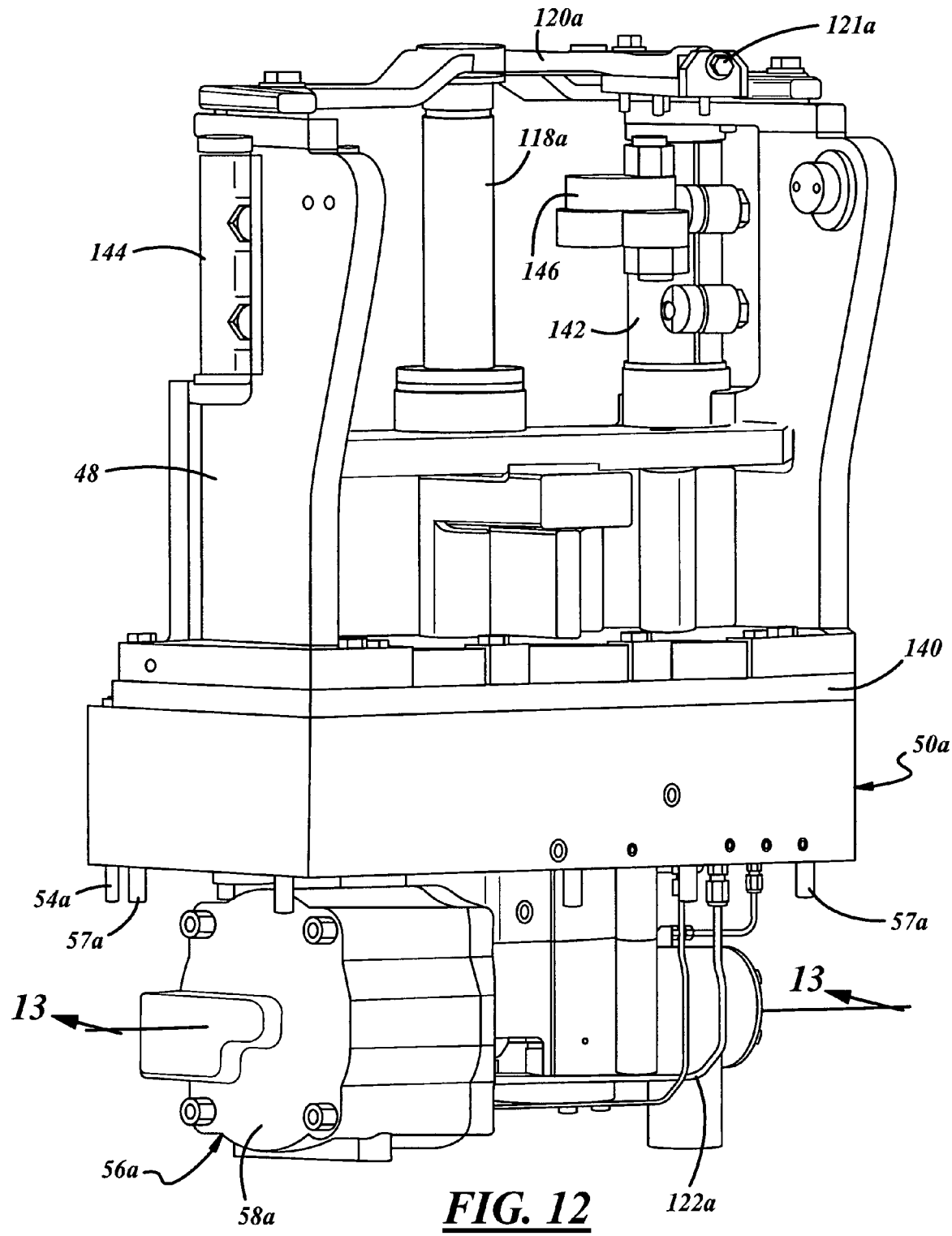
FIG. 12 is a rear perspective view of the blow mold operating mechanism in FIG. 11 with the mold arms removed.
Figure 13:
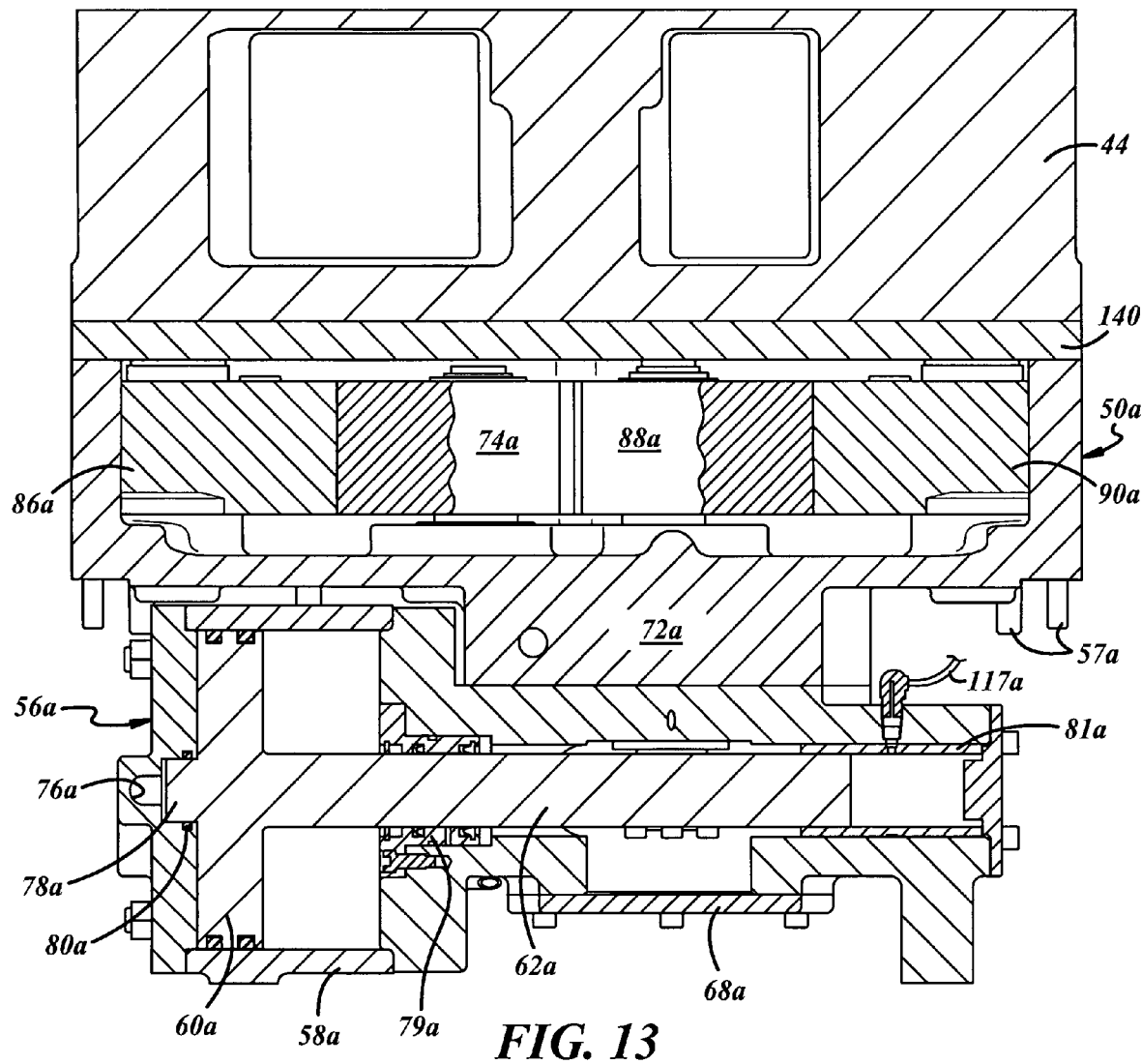
FIG. 13 is a sectional view taken substantially along the line 13-13 in FIG. 12.
Figure 14:
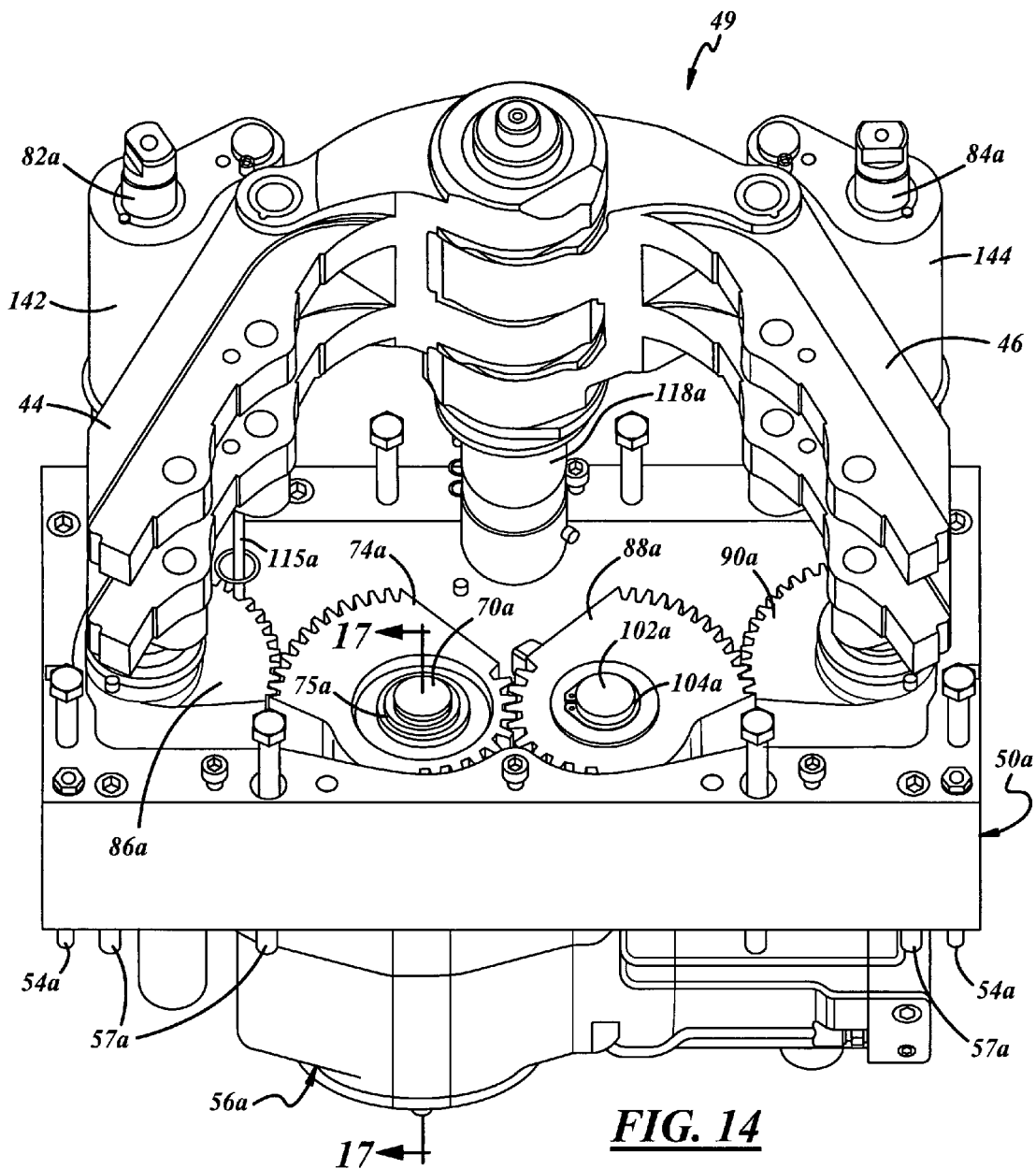
FIG. 14 is a perspective view of the blow mold operating mechanism in FIGS. 11 and 12 with the blow mold support bracket removed.
Figure 15:
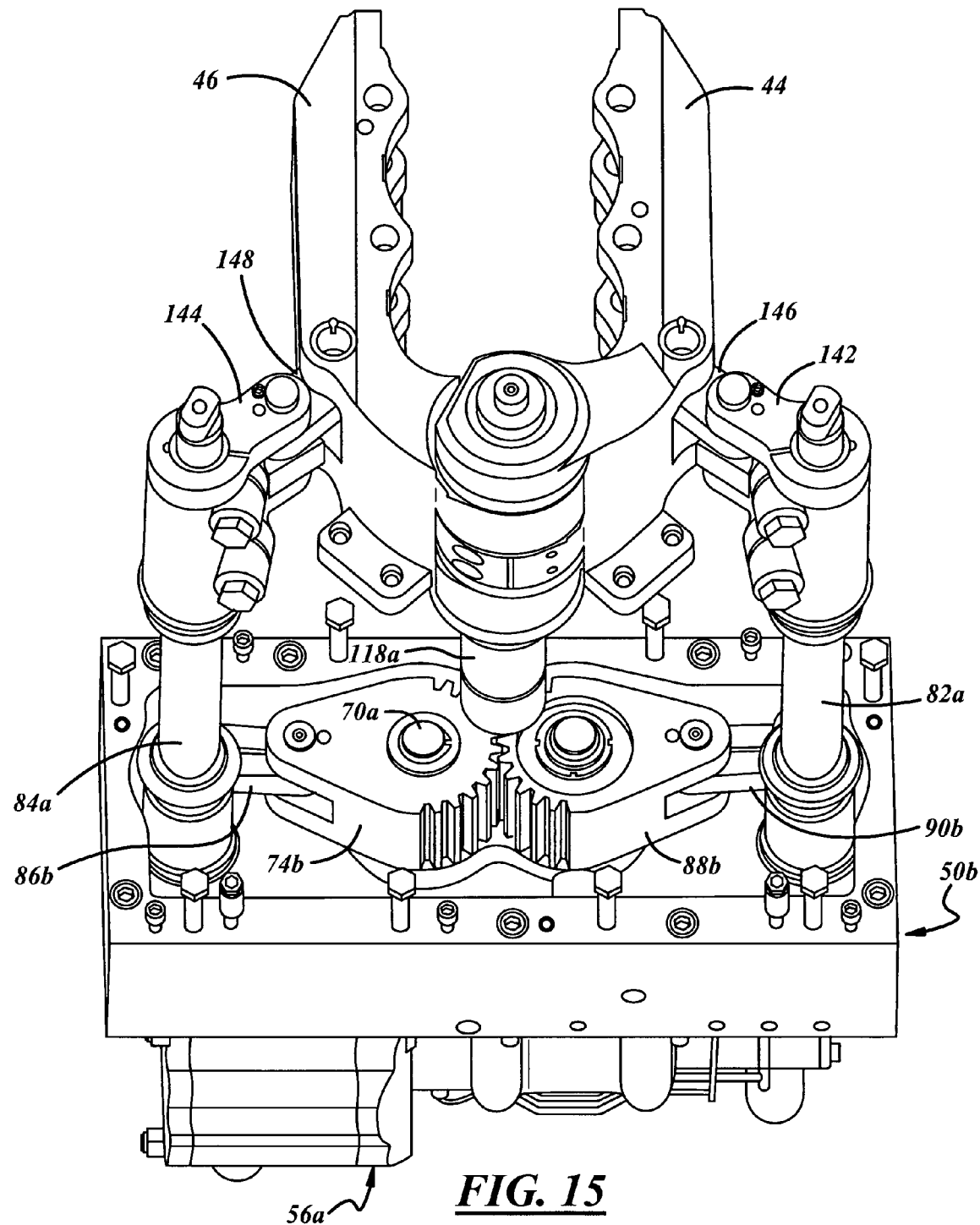
FIG. 15 is a rear perspective view of a blow mold operating mechanism in accordance with a modification to the embodiment of FIG. 14.

Thus, actuation of piston 60 and piston rod 62 simultaneously rotates drive gears 66,74, rotates idler gear 88 in a direction opposite to drive gear 74, and rotates gears 90,86 and operating shafts 82,84 in respectively opposite directions. Operating shaft levers 110,112 and links 114,116 are responsive to such rotation of operating shafts 82,84 to pivot blank mold arms 38,40 (FIGS. 1 and 2) in opposite directions. Blank mold arms 38,40 preferably are pivotally mounted on a mold arm hinge post 118 (FIGS. 3 and 10). Hinge post 118 has a lower end secured to blank mold support bracket 42 and an upper end received in and secured to an antideflection plate 120, which in turn is mounted on blank mold support bracket 42. With hinge post 118 secured at both ends, droop or sag of the mold arms is reduced or eliminated. Antideflection plate 120 can be adjusted by jackbolt 121 to adjust and remove droop or sag in the mold arms. Pocket 76 in cylinder housing 58 (FIG. 8) is connected by an air line 122 to an internal passage 123 in gearbox 50 that contains a needle valve screw 124 to control air flow. When end 78 of piston rod 62 enters pocket 76 during rightward motion in FIG. 8,—i.e., as the mold arms approach the fully open position—the air captured within pocket 76 cushions piston 60 at the end of its travel. A screw 124 (FIGS. 4 and 5) throttles flow of air from pocket 76 to modulate and control this cushioning effect. Needle valve screw 125 (FIG. 4) controls the cushion of the mold open cylinder An actuator, preferably an air cylinder 126 (FIGS. 1-2,4 and 10), is mounted on blank mold support bracket 42. Air cylinder 126 has a piston 128 with a piston rod 130. A wedge block 132 is mounted on the end of piston rod 130 for receipt between rollers 134,136 on the ends of blank mold arms 38,40. With the blank mold arms in the fully closed position illustrated in FIG. 10, air cylinder 126 can be actuated to drive wedge block 132 between rollers 134,136 and thereby lock the mold arms (and the blank mold sections carried by the mold arms) in the closed position. The wedge block is retracted before the mold arms are opened by cylinder 58.

Figure 16:
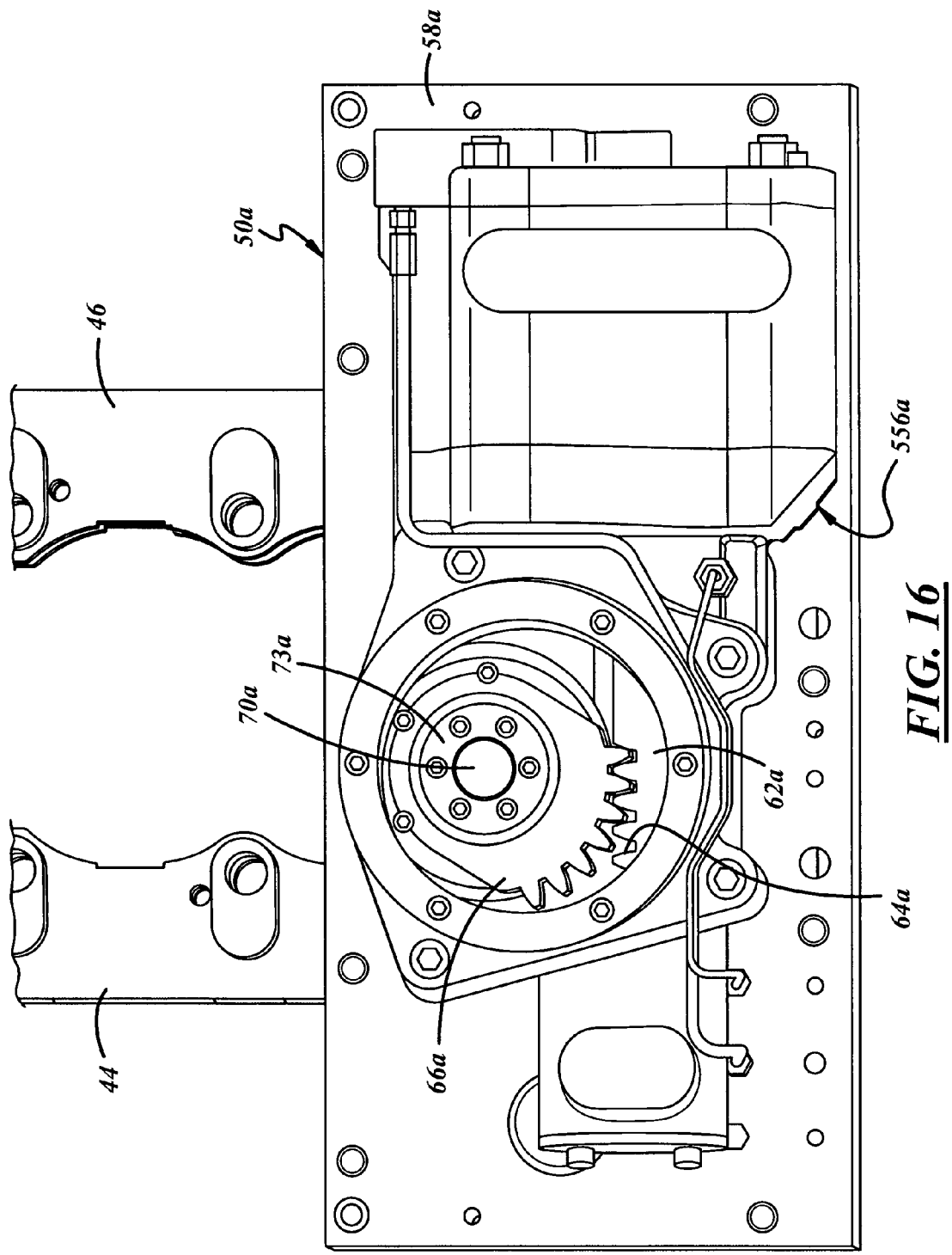
FIG. 16 is a bottom plan view of the blow mold operating mechanism with the cylinder housing cover removed.
Figure 17:
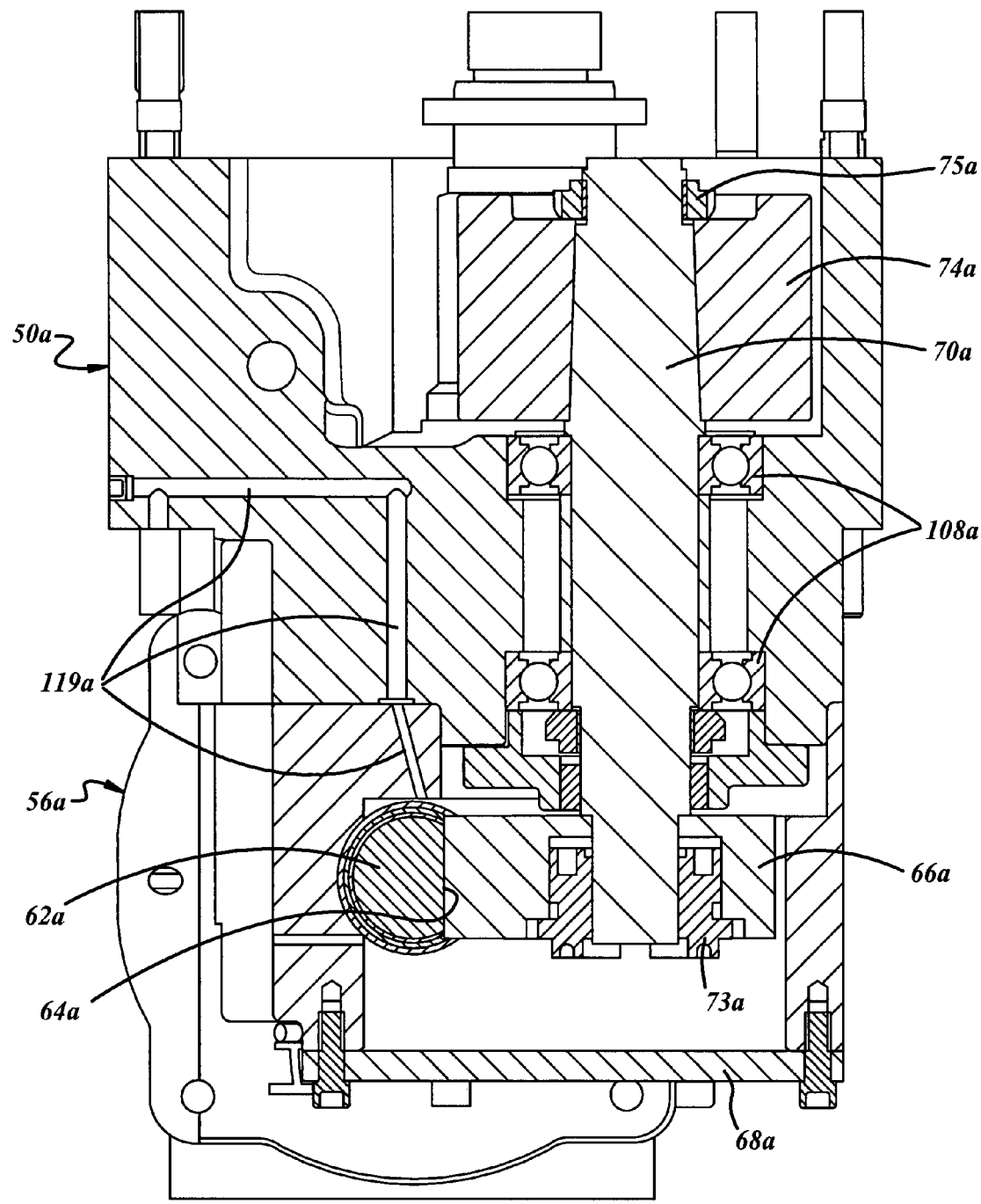
FIG. 17 is a sectional view taken substantially along the line 17-17 in FIG. 14.

FIGS. 11-17 illustrate the mechanism 49 for opening and closing the mold arms 44,46 at blow mold station 34. Mechanism 49 at the blow mold station is very similar to blank mold open/close mechanism 47 discussed in detail above, and corresponding elements are identified in FIGS. 11-17 by correspondingly identical reference numerals with the letter "a" or "b." Blow mold support bracket 48 is mounted on a gearbox 50*a* by means of a plate 140 (FIGS. 1, 11 and 12) to allow the blow mold support bracket to be disassembled from gearbox 50*a*. Cylinder housing 56*a* includes a piston 60*a* and a piston rod 62*a* with gear rack teeth 64*a* (FIG. 16) machined into rod 62*a*. First drive gear 66*a*, which preferably is a sector gear in FIG. 16, is coupled to a drive shaft 70*a* beneath a cover 68*a*. Within gearbox 50*a*, in the embodiment of FIG. 14, drive shaft 70*a* is coupled to a second drive gear 74*a*, which is directly coupled to a gear 86*a* coupled to an operating shaft 84*a*. Second drive gear 74 also is coupled through an idler gear 88*a* to a gear 90*a* coupled to operating shaft 82*a*. Gears 74*a*,86*a*,88*a*,90*a* preferably are sector gears in the embodiment of FIG. 14. In the alternative embodiment of FIG. 15, shaft 70*a* is coupled to a second drive gear 74*b*, which is coupled to operating shaft 84*a* by a link 86*b*. Second drive gear 74*b* also is coupled by an idler gear 88*b* and a link 90*b* to operating shaft 82*a* in the embodiment of FIG. 15. The upper ends of operating shafts 82*a*,84*a* are coupled by arms 142,144 and links 146,148 to blow mold arms 44,46 respectively. Thus, linear motion of piston 60*a* functions through piston rod gear rack teeth 64*a*, first drive gear 66*a*, drive shaft 70*a*, second drive gear 74*a* or 74*b*, idler gear 88*a* or 88*b*, and gears 86*a*,90*a* or links 86*b*,90*b* to rotate operating shafts 82*a*,84*a* in opposite directions, and thereby to open and close blow mold arms 44,46 (and the blow mold sections carried by the blow mold arms).

There thus has been disclosed an apparatus for opening and closing the mold arms in a glassware forming machine that fully satisfies all of the objects and aims previously set forth. The mold open/close mechanism can readily be removed from the machine section frame for maintenance or repair. There is substantial commonality of parts between the blank and blow mold operating mechanisms, and between operating mechanism for differing machine sizes. The disclosure has been presented in conjunction with several exemplary embodiments, and additional modifications and variations have been discussed. Other modifications and variations readily will suggest themselves to persons of ordinary skill in the art in view of the foregoing description. The disclosure is intended to embrace all such modifications and variations as fall within the spirit and broad scope of the appended claims.

The invention claimed is:

1. Apparatus for opening and closing mold arms in a glassware forming machine, which includes:
   a gearbox for mounting on a glassware machine frame,
   a cylinder housing suspended beneath said gearbox,
   a cylinder disposed within said cylinder housing, said cylinder having a piston with an extending piston rod and a gear rack in said piston rod,
   a first drive gear in said cylinder housing coupled to said gear rack and to a drive shaft that extends from said first drive gear and said cylinder housing into said gearbox,
   a second drive gear disposed in said gearbox and coupled to said shaft,
   laterally spaced operating shafts extending upwardly from within said gearbox,
   means including an idler gear coupling said second drive gear to said operating shafts such that said operating shafts are rotated simultaneously in opposite directions by said cylinder through said piston rod, said first drive gear, said drive shaft, said second drive gear and said means including an idler gear, and
   linkages for coupling said operating shafts to the mold arms of the glassware forming machine.

2. The apparatus set forth in claim 1 wherein said means include driven gears coupling said second drive gear and said idler gear to said operating shafts.

3. The apparatus set forth in claim 2 wherein said driven gears have tapered polygonal openings, and wherein said operating shafts have tapered polygonal ends received in said tapered polygonal openings of said driven gears.

4. The apparatus set forth in claim 2 wherein said driven gears are sector gears.

5. The apparatus set forth in claim 1 wherein said means include links coupling said second drive gear and said idler gear to said operating shafts.

6. The apparatus set forth in claim 1 wherein said idler gear and said second drive gear are sector gears.

7. The apparatus set forth in claim 1 wherein said first and second drive gears have tapered polygonal openings, and wherein said drive shaft has tapered polygonal ends received in said tapered polygonal openings of said first and second drive gears.

8. The apparatus set forth in claim 1 wherein said gearbox includes alignment means for mounting and aligning said gearbox on the glassware machine frame.

9. The apparatus set forth in claim 8 wherein said alignment means include an array of alignment pins extending around a periphery of said gearbox.

10. The apparatus set forth in claim 1 wherein said piston rod extends into a cavity in said cylinder housing, and wherein said apparatus includes an air passage extending from said cavity for limiting exhaust of air from said cavity and thereby cushioning motion of said cylinder.

11. The apparatus set forth in claim 10 wherein said cavity includes a pocket in a wall of said cylinder housing opposite an end of said piston rod and a seal around said pocket to engage an end of said piston rod.

12. The apparatus set forth in claim 11 including a screw on said gearbox extending into said air passage to throttle flow of air from said pocket.

13. The apparatus set forth in claim 1 including a mold support bracket mounted on said gearbox.

14. The apparatus set forth in claim 13 including a mold arm hinge post having one end coupled to said mold support bracket, and an antideflection bracket carried by said mold support bracket and coupled to a second end of said mold hinge post to prevent deflection of said mold hinge post.

15. The apparatus set forth in claim 13 including a lock cylinder mounted on said mold support bracket, said lock cylinder having a piston and an extending piston rod, and a lock wedge mounted on said piston rod for receipt between ends of mold arms mounted on said mold support bracket to lock the mold arms in a closed position.

* * * * *